(No Model.)
A. CLANCY.
APPARATUS FOR CONNECTING PIPES.
No. 484,408. Patented Oct. 18, 1892.
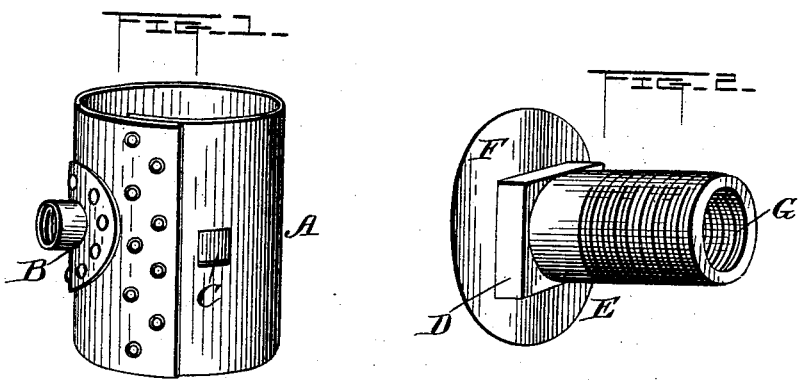
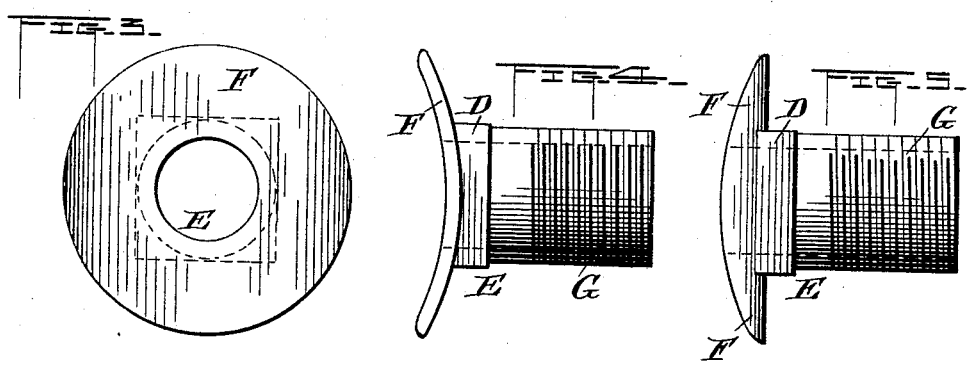
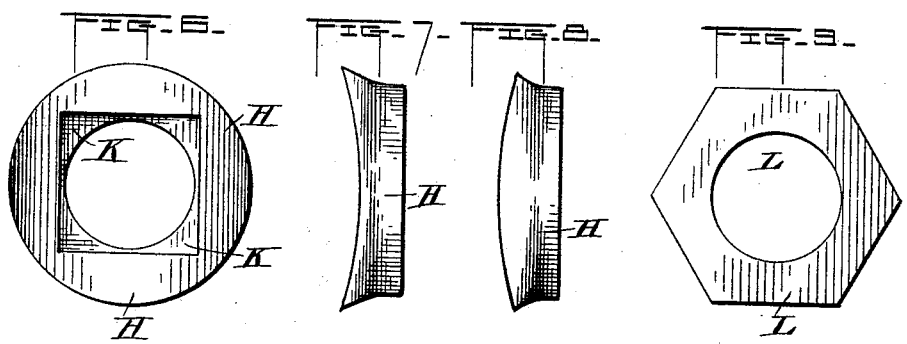
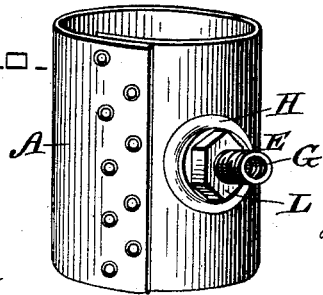
Witnesses
Severance.
Ralph Dashaw.
Inventor
Andrew Clancy
By John Wedderburn
Attorney

UNITED STATES PATENT OFFICE.

ANDREW CLANCY, OF SAN DIEGO, CALIFORNIA.

APPARATUS FOR CONNECTING PIPES.

SPECIFICATION forming part of Letters Patent No. 484,408, dated October 18, 1892.

Application filed June 1, 1892. Serial No. 435,162. (No model.)

*To all whom it may concern:*

Be it known that I, ANDREW CLANCY, of San Diego, in the county of San Diego and State of California, have invented certain new and useful Improvements in Apparatus for Connecting Pipes; and I do hereby declare the following to be a full, clear, and exact description of the invention, such as will enable others skilled in the art to which it appertains to make and use the same.

My invention relates to improvements in pipe-connections; and its object is to supply means whereby any ordinary person unskilled in the art may connect a sheet of iron pipe to a cylindrical or curved surface with greater ease and certainty of success than has hitherto accompanied the best mechanical skill; and the invention particularly resides in the novel combination, construction, and arrangement of parts hereinafter specified, and set forth in the claim.

In the accompanying drawings, Figure 1 is a perspective view of the large pipe or cylinder to which the connection is to be made, showing, also, the old method of making such connections. Fig. 2 is a perspective view of the nozzle. Figs. 3, 4, and 5 are end, top, and side views, respectively, of the nozzle. Figs. 6, 7, and 8 are similar views of the washer. Fig. 9 is a perspective view of the nut, and Fig. 10 is a perspective view showing the connection in position.

A represents a large pipe or cylinder, showing at B a pipe with flange riveted thereto by the old method. In using my improved device a square hole C is cut into the cylinder to register with the square shoulder D on the nozzle E. This nozzle is provided with a plate F, curved to conform to the surface of the cylinder A, and the pipe G of the nozzle is threaded both inside and outside, and by using either the outside or inside thread larger or smaller pipes can be screwed thereon, as desired.

H is a washer adapted to be slid upon the pipe G, having an inner surface cylindrical to conform to the outer surface of the pipe A and a plane outer surface. The inner or cylindrical surface of the washer has a square recess K, adapted to receive the square shoulder D of the nozzle.

L is a nut, which is screwed tight up against the washer, making the whole water-tight.

In using my device after cutting a square hole in the cylinder the nozzle is inserted through this hole from the inside, the square shoulder D is placed in the hole C, the washer H is placed over the pipe of the nozzle, its recess receiving the shoulder D of the nozzle, and the nut L is screwed into position.

Having thus fully described my invention, what I claim, and desire to secure by Letters Patent, is—

In a pipe connection, a pipe threaded at one end and enlarged at the other end by a rectilinear shoulder and terminating in a cylindrically-curved flange or plate adjacent to the shoulder, in combination with a washer having on one side a rectilinear recess, said side being curved cylindrically, and a nut adapted to hold said washer in position on said shoulder, substantially as and for the purpose set forth.

In testimony whereof I have signed this specification in the presence of two subscribing witnesses.

ANDREW CLANCY.

Witnesses:
ENOCH WINSBY,
FRANK OVER.